(12) United States Patent
Meppelink et al.

(10) Patent No.: US 6,396,678 B1
(45) Date of Patent: May 28, 2002

(54) CAPACITOR

(75) Inventors: Jan Meppelink, Söst; Jörg Kühle, Welver-Borgeln; Frank Wallmeier, Lippstadt; Meinolf Dingenotto, Schloss Holte, all of (DE)

(73) Assignee: FILTEC fuer die Electronikindustrie GmbH, Lippstadt (DE)

( * ) Notice: Subject to any disclaimer, the term of this patent is extended or adjusted under 35 U.S.C. 154(b) by 0 days.

(21) Appl. No.: 09/642,333

(22) Filed: Aug. 21, 2000

(30) Foreign Application Priority Data

Aug. 19, 1999 (DE) ..................... 299 14 584 U

(51) Int. Cl.$^7$ .......................... H01G 4/005; H01G 4/00; H01G 4/06
(52) U.S. Cl. ..................... 361/303; 361/301.1; 361/311
(58) Field of Search .............................. 361/303, 306.1, 361/311–313, 301.1

(56) References Cited

U.S. PATENT DOCUMENTS

| | | | | |
|---|---|---|---|---|
| 4,769,527 A | * | 9/1988 | Hart | |
| 4,916,576 A | * | 4/1990 | Herbert | |
| 5,078,914 A | * | 1/1992 | Ambros | |
| 5,242,318 A | * | 9/1993 | Plass | |
| 5,689,180 A | * | 11/1997 | Carlson | |
| 5,817,533 A | * | 10/1998 | Sen | |
| 5,903,431 A | * | 5/1999 | Wilmot | |
| 5,923,523 A | * | 7/1999 | Herbert | |

FOREIGN PATENT DOCUMENTS

JP         11214206 A    *    8/1999

OTHER PUBLICATIONS

Daniel Metzger, Electronic Circuit Behavior, Prentice–Hall, Englewood Cliffs, New Jersey (1975), section 3.11 (PI filter using a resistor), p. 61.*
J. Meppelink, K. Diederich, K. Feser, and W. Pfaff, Very Fast Transients in GIS, IEEE Transactions on Power Delivery 4(1), 223–233 (1989).*

* cited by examiner

Primary Examiner—Nathan Flynn
Assistant Examiner—Johannes Mondt
(74) Attorney, Agent, or Firm—Herbert L. Lerner; Laurence A. Greenberg; Werner H. Stemer

(57) ABSTRACT

A capacitor having a signal electrode connected to a signal conductor, a ground electrode connected to a ground conductor and a dielectric disposed between the two. In the capacitor, delay-time-dependent limits are moved to higher frequency ranges in order to extend the applicability in the frequency range. This is accomplished by the signal conductor or the ground conductor being spaced apart from the signal electrode or the ground electrode and thus from the dielectric having a high dielectric constant. The signal conductor or the ground conduct is subdivided into at least two conductor regions that are separated in the direction of signal propagation. Each of the conductor regions is electrically connected via at least one conductor connector to the signal conductor or to the ground conductor, respectively.

12 Claims, 3 Drawing Sheets

CAPACITOR

BACKGROUND OF THE INVENTION

Field of the Invention

The invention relates to a capacitor having a signal electrode connected to a signal conductor and a ground electrode connected to a ground conductor. The capacitor further has a dielectric layer with a high dielectric constant provided between the signal electrode and the ground electrode.

Tubular or through-connection capacitors are known, as well as chip capacitors which, having appropriate capacitance values, are used as filter capacitors. The capacitance values and dielectric strength of these capacitors can in this case in general be set to the desired values, but, when such capacitors are in use, particularly with dielectrics having high dielectric constants, at high frequencies (above about $10^3$), delay time effects limit the usage options. These limits occur where such delay time effects do not allow the capacitor to be charged simultaneously over its entire plate area.

SUMMARY OF THE INVENTION

It is accordingly an object of the invention to provide a capacitor that overcomes the disadvantages of the prior art devices of this general type, in which the delay-time-dependent limit is moved to a higher frequency range, in order to extend the applicability in the frequency range under this.

With the foregoing and other objects in view there is provided, in accordance with the invention, a capacitor, including a signal electrode that is subdivided into at least two conductor regions that are separated in a direction of signal propagation, a ground electrode, and a dielectric layer having a high dielectric constant that is disposed between the signal electrode and the ground electrode. A signal conductor and a plurality of conductor connectors are provided. At least one of the conductor connectors is disposed between and electrically connecting each of the two conductor regions of the signal electrode to the signal conductor such that the signal conductor is spaced apart from the signal electrode and thus from the dielectric having the high dielectric constant. Finally, a ground conductor is connected to the ground electrode.

Alternatively, the capacitor includes a ground electrode that is subdivided into at least two conductor regions being separated in a direction of signal propagation, a signal electrode, and a dielectric layer having a high dielectric constant that is disposed between the signal electrode and the ground electrode. A ground conductor and a plurality of conductor connectors are provided. At least one of the conductor connectors is disposed between and electrically connecting each of the two conductor regions of the ground electrode to the ground conductor such that the ground conductor is spaced apart from the ground electrode and thus from the dielectric having the high dielectric constant. Finally, a signal conductor is connected to the signal electrode.

In order to achieve the objective, the signal conductor or the ground conductor is disposed such that it runs at a distance from the plates. With this configuration, the high dielectric constant of the dielectric of the capacitor (dielectric constant approximately in the range from $10^3$–$2 \times 10^4$) can no longer exert any influence on the conductor, and the propagation speed of the signal on the conductor is not reduced. Generally, even a relatively short air gap is sufficient for this purpose. The signal conductor or the earth conductor thus do not run on the dielectric of the capacitors having a high dielectric constant, but in a medium with a low dielectric constant (dielectric constant approximately in the range from $10^0$–$10^1$) and the propagation speed on the freely running signal conductor or ground conductor corresponds to that in air. It can thus be regarded as being "underlayed", while the propagation speed when in contact with the dielectric is considerably reduced, owing to the high dielectric constant.

In this case, one of the electrodes (the signal or ground electrode) which is associated with the conductor that is at a distance from the dielectric material is subdivided in the direction of signal propagation into individual conductor regions, which are electrically insulated from one another. The conductor regions are electrically connected via in each case one separate connecting conductor to the conductor which is at a distance from the dielectric, so that the electrically mutually insulated conductor regions are connected like a parallel circuit, seen from the signal or ground conductors. Since the signals propagate without any delay on the signal conductor or the ground conductor disposed at a distance from the dielectric, the signal voltages appear virtually simultaneously at the connecting conductor associated with a capacitor, so that the individual conductor regions are charged and discharged (virtually) simultaneously. Owing to this "simultaneity", delay time differences are suppressed, and their disturbing influence region is shifted toward higher frequencies. Each conductor connector is advantageously connected roughly in the form of a point to the associated signal conductor or ground conductor. This connection is advantageously disposed in the center of the conductor. In this case, the term "center" is the center, lying in the propagation direction of the signals of the conductor region. This type of connection ensures (virtually) simultaneous charging and discharging of the capacitor subdivided in such a way.

In order to allow the electrical characteristics to be influenced, the mutually insulated conductor regions are connected via electronic components like a series circuit. Resistance elements, preferably purely non-reactive resistors, may be provided as components in this case. Since the propagation speed of the signals on the signal conductor or the ground conductor is dependent on the dielectric constant of the material surrounding the conductor, and owing to the discontinuities which occur when resistors are connected in conductors carrying signals, the resistance values of the resistors should be in the region of the characteristic impedance of the signal conductor or the ground conductor which is interacting with the dielectric having the high dielectric constant. This configuration ensures that discontinuities caused by connection are kept small.

The individual plates of the capacitor which are associated with the signal conductor are, in a development, connected via electrical components, for which purpose resistors, varistors or the like may be used. Surface mounted components are advantageously provided as the resistance components, which are soldered onto two adjacent conductor regions, represent a bridge, and electrically connect the two adjacent conductor regions to one another via the resistor, like a series circuit. In another embodiment, strips of resistance pastes that are known from planar technology are applied, for example, using the screen-printing method are provided. The resistance pastes form resistance components, which connect two adjacent conductor regions to one another. Varistors are suitable to achieve voltage limiting, in particular peak-voltage limiting in the case of surge loads, in which case the value of the limiting voltage can be achieved by suitable varistor selection or the varistor-like material.

In addition to resistors of a purely non-reactive nature, inductive elements can also be provided for connection of the signal conductors or of the ground dissipation conductors, as a result of which the non-reactive resistors also contain an inductive component. For this purpose, the signal conductor or the ground conductor is connected to at least one inductance. Surface mounted coils may be connected into the signal conductor or the ground dissipation conductor as inductances. Alternatively, layers or rings composed of a ferritic material may also be provided on the signal conductor or the ground dissipation conductor for this purpose.

In one advantageous development, inductances are provided between at least some of the connecting points of the conductor connectors of two successive conductor regions of the signal or ground electrodes which are subdivided into the individual conductor regions. Surface mounted coils may be connected in the signal conductor or ground conductor as inductances. Alternatively, beads or rings composed of a ferritic material may also be provided on the signal or ground conductor in this case, and these are advantageously disposed in the region between the subdivided plates. The configuration results in filters with parallel-connected parallel-path capacitors, which are connected via series-path inductances. The filter characteristics of such configurations may be matched to the requirement by choice of the ring material and/or of the capacitors. In addition, it is also possible to insert inductive components—for example surface mounted coils—in the freely running signal conductor or ground conductor, which are then connected in series for signal connection or ground connection.

Other features which are considered as characteristic for the invention are set forth in the appended claims.

Although the invention is illustrated and described herein as embodied in a capacitor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
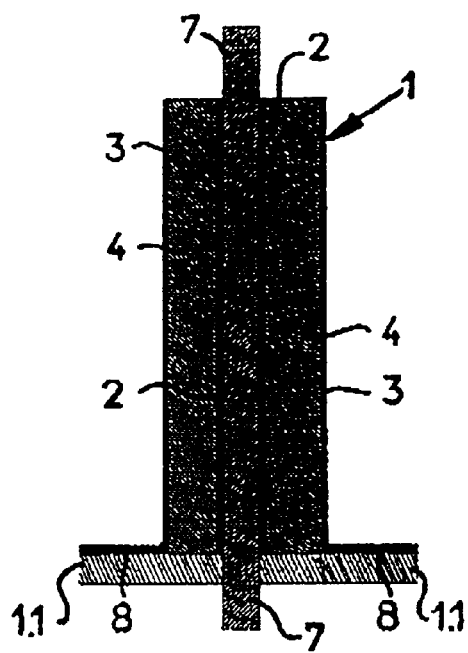
FIG. 1 is a diagrammatic, sectional view of a capacitor configuration having undivided electrodes on a dielectric having a high dielectric constant according to the invention.

In all the figures of the drawing, sub-features and integral parts that correspond to one another bear the same reference symbol in each case. Referring now to the figures of the drawing in detail and first, particularly, to FIG. 1 thereof, there is shown, by way of example, one embodiment of the capacitor 1, which is placed on a base 1.1. A signal conductor 7 passes through the base 1.1, while a ground supply is indicated as a metallic coating 8 on the base 1.1. FIG. 1 shows a conventional capacitor 1, in which a signal electrode 2 and a ground electrode 3 rest directly on a dielectric 4.

Figure 2:
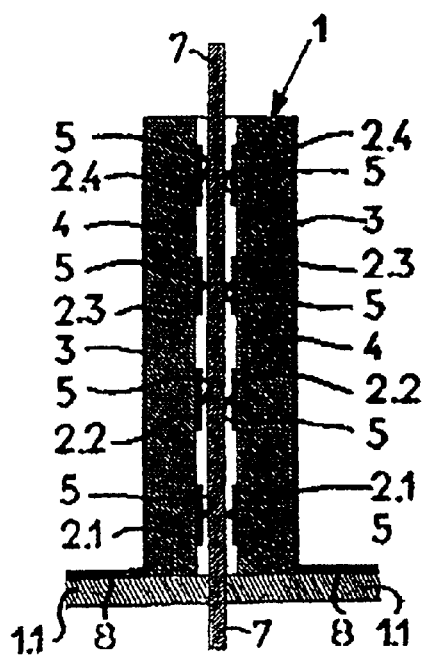
FIG. 2 is a sectional view of the capacitor configuration having a subdivided signal electrode at a distance from the dielectric having the high dielectric constant.
Figure 3:
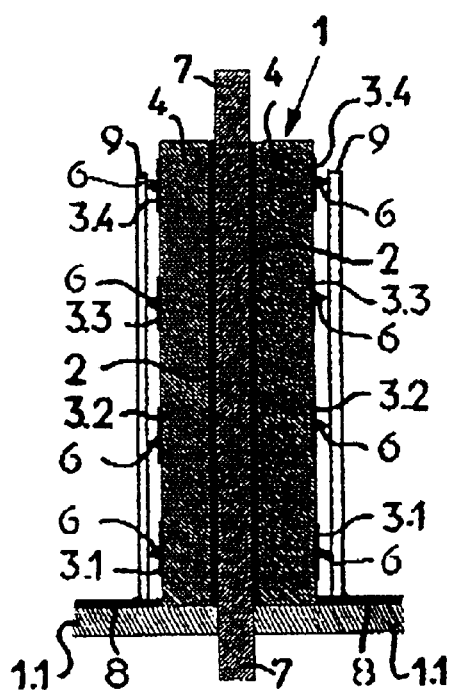
FIG. 3 is a sectional view of the capacitor configuration having a subdivided ground electrode at a distance from the dielectric having the high dielectric constant.

In FIG. 2 and according to the invention, the electrode 2 connected to the signal conductor 7 is subdivided into electrode elements and in this example four electrode elements 2.1, 2.2, 2.3 and 2.4 are shown. In FIG. 3, electrode elements 3.2, 3.2, 3.3 and 3.4 are formed from the electrode 3 that is connected to a ground conductor 9.

In the non-subdivided configuration (FIG. 1), both the signal electrode 2 and the ground electrode 3 rest directly against the dielectric 4. Owing to the interaction which occurs between the conductors and the dielectric in this case, the signal propagation speed is reduced here, and the charging and discharging of the signal electrode 2 and the ground electrode 3 thus have a time-delayed profile, which depends on the reduction in the propagation speed resulting from the interaction between the dielectric 4 and the conductor carrying the signal. This is particularly noticeable if, in order to achieve high capacitances, the capacitor 1 has a dielectric with a high dielectric constant (for example in the order of magnitude of $10^3$ to $10^4$), and if the operational range of the capacitor 1 extends up to high frequencies (Gigahertz range) that such delay time effects cause noticeable disturbance.

The time delay can be overcome if the signal electrode is subdivided and the electrode elements 2.1–2.4, 3.1–3.4 are connected to the conductor 7, 9 on which the signals propagate without any delay. To this end, the conductors 7, 9 carrying the signal must be disposed such that they are not influenced by the dielectric constant of the dielectric 4. Such a configuration, in which such disturbing delay time effects are suppressed in that one of the signal-carrying conductors, the signal conductor 7 or the ground conductor 9, is disposed at a distance from the dielectric 4. The electrodes or plates 2, 3, respectively, which form the capacitor 1 are subdivided into the electrode elements 2.1, 2.2, 2.3 and 2.4, and 3.1, 3.2, 3.3 and 3.4 respectively, which are connected to the signal conductor 7 or to the ground conductor 9, respectively, via conductor connectors 5 or 6, respectively, is shown in FIG. 2 (for the signal conductor 7 at a distance from the dielectric 4) and FIG. 3 (for the ground conductor 9 at a distance from the dielectric 4). Since there is no relevant interaction between the conductor 7 or 9 and the dielectric 4 in this configuration, there is no influence on the signal propagation and the electrode elements are charged or discharged (virtually) simultaneously, so that, in the frequency range in use, no significant delay-time-dependent disturbance influences occur, and these are shifted to higher frequency ranges.

In FIG. 2, a diameter of the signal conductor 7 is considerably smaller than a diameter of the hole through the dielectric 4, so that the signal conductor 7 is at a considerable distance from the dielectric 4. The electrode elements 2.1, 2.2, 2.3 and 2.4 are connected via the conductor connectors 5 to the signal conductor 7, so that the latter runs at a distance from the electrode elements 2.1–2.4 and from the dielectric 4. Analogous conditions occur when the ground conductor 9 which is connected to the general ground via the metallic coating 8 is disposed at a distance from the dielectric 4 (FIG. 3). In this case, the electrode elements 3.1, 3.2, 3.3 and 3.4 are connected to the ground conductor 9 via the conductor connectors 6, so that, once again, the dielectric constant has no delaying effect on the propagation speed. In both cases, the electrode elements are charged and discharged without any delay; delay time differences are suppressed.

Figure 4A:
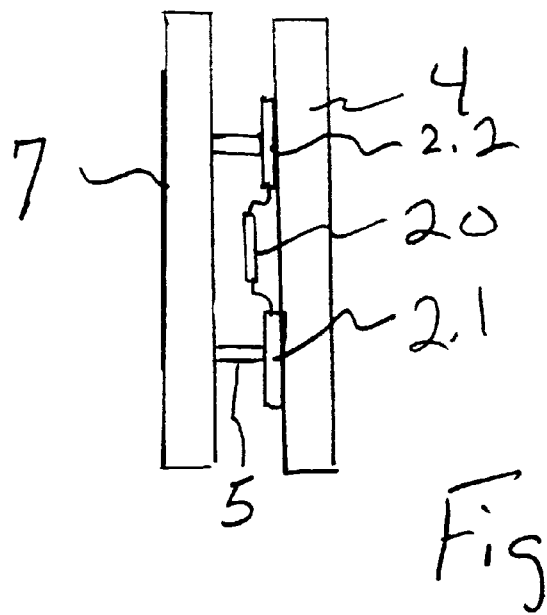
FIGS. 4a and 4b are fragmented, sectional views showing an electronic component connected between the subdivided electrode.

In FIG. 4a, an electronic component 20 is connected between each of the mutually insulated conductor regions 2.1–2.4 of the signal electrode 2 and forms a series circuit. The electronic component 20 can be a resistance element and in particular a non-reactive resistance element. The signal conductor 7 has a characteristic impedance and the resistance element 20 has a resistance value in a region of the characteristic impedance of the signal conductor 7 which interacts with a material having a high dielectric constant. The resistance element 20 can be a surface mounted component soldered between each two neighboring conductor regions 2.1, 2.2; 2.2, 2.3; 2.3, 2.4. Furthermore, the resistance element is formed of a resistance paste.

Figure 4B:
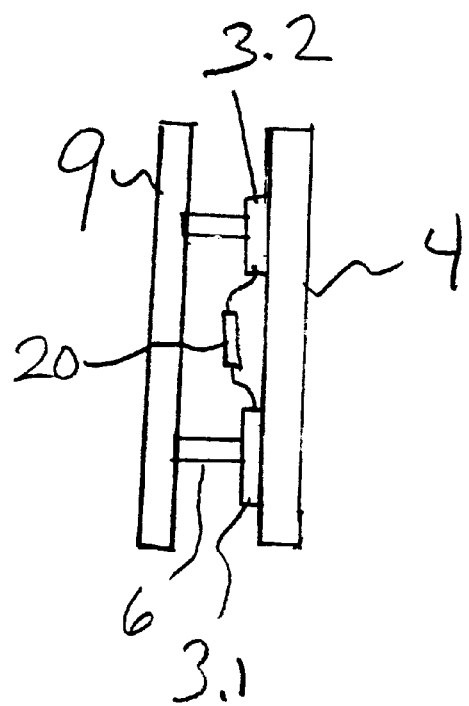

In FIG. 4b, the electronic component 20 is connected between each of the mutually insulated conductor regions 3.1–3.4 of the ground electrode 3 and forms a series circuit. The electronic component 20 can be the resistance element and in particular a non-reactive resistance element. The ground conductor 9 has a characteristic impedance and the resistance element 20 has a resistance value in a region of the characteristic impedance of the ground conductor 9 which interacts with a material having a high dielectric constant. The resistance element 20 can be a surface mounted component soldered between each two neighboring conductor regions 3.1, 3.2; 3.2, 3.3; 3.3, 3.4. Furthermore, the resistance element 20 can be formed of a resistance paste.

Figure 5:
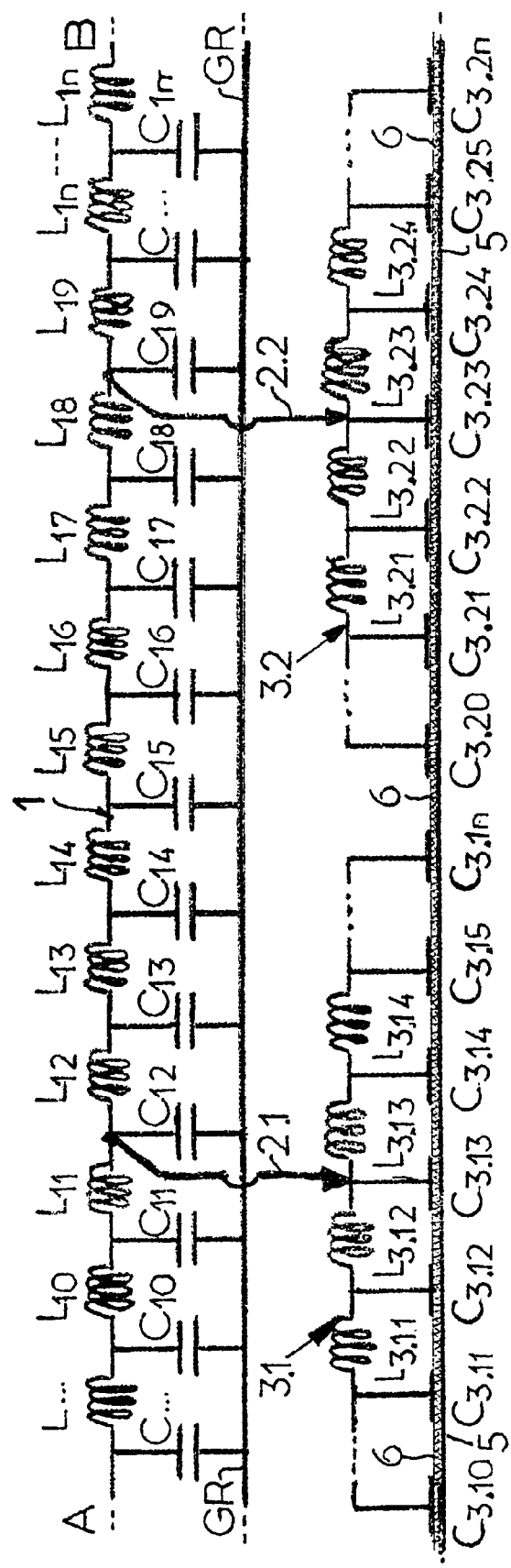
FIG. 5 is a sectional view showing a filter capacitor.

FIG. 5 shows a subdivided filter capacitor having two conductive regions 3.1 and 3.2 acting as a first electrode. The first conductor 1 is a transmission line having resistance/inductance $L_{1n}$, as well as parasitic capacitance $C_{1n}$ against ground GR spread through conductor 1. Connectors $2_1$ and $2_2$ contact the conductive regions $3_1$ and $3_2$ with the conductor 1. At high frequencies, each of the conductive regions itself has a capacitance $C_{3.11} \ldots C_{3.21}$ and $C_{3.21} \ldots C_{3.2n}$ as well as resistances/inductivities $L_{3.11} \ldots L_{3.1n}$ and $L_{3.21} \ldots L_{3.2n}$ spread over the conductive regions, which is shown as small equivalent circuit elements.

A second conductor 5 forms the second electrode of the capacitor. The second conductor 5 is separated from the first electrode by the dielectric layer 6. The dielectric layer 6 has a high dielectric constant.

An incoming signal moves from A to B with a velocity near the speed of light. Therefore, all conductive regions of the capacitor are charged or discharge synchronously. The speed of charge-flow inside each of the conductive regions is lowered by the dielectric constant of the material dielectric layer 6. This lowering may be in the magnitude of $10^2$ if the dielectric constant rises to a value above $10^4$. This construction prevents "line-lag".

We claim:

1. A coaxial filter-capacitor for high frequency ranges, comprising:
    a signal conductor;
    a signal electrode connected to said signal conductor and subdivided into at least two conductor regions being separated in a direction of signal propagation and being mutually insulated from one another and each having an area;
    a ground conductor;
    a ground electrode connected to said ground conductor;
    a first dielectric layer having a relative dielectric constant of at least $10^3$ disposed between said conductive regions of said signal electrode and said ground electrode;
    a plurality of signal connectors electrically connecting said conductor regions of said signal electrode to said signal conductor, and each signal connector respectively contacting one of said conductor regions and having a substantially smaller area than the area of the respective connected conductor region; and
    a second dielectric layer having a relative dielectric constant of at least $10^0$;
        said signal conductor being separated from said conductive regions of said signal electrode by said second dielectric layer and thus from said first dielectric layer; and
        each of said signal connectors being lead through said second dielectric layer and having a relative dielectric constant of about $10^0$.

2. The coaxial capacitor according to claim 1, wherein said at least two mutually insulated conductive regions include an electronic component connecting directly adjacent mutually insulated conductive regions forming a series circuit; and said electric component is a resistance element.

3. The coaxial capacitor according to claim 2, wherein said resistance element has a characteristic impedance in the same order as said signal electrodes.

4. The coaxial capacitor according to claim 3, wherein said resistance element is a surface mounted component soldered to each said at least two conductor regions.

5. The coaxial capacitor according to claim 3, wherein said resistance element is formed from a resistance paste.

6. The coaxial capacitor according to claim 3, wherein said resistance element is a non-reactive resistance element.

7. A coaxial capacitor for use in very high frequency ranges, comprising:
    a ground conductor;
    a ground electrode connected to said ground conductor and subdivided into at least two conductor regions being separated in a direction of signal propagation and being mutually insulated from one another;
    a signal conductor;
    a signal electrode connected to said signal conductor;
    a first dielectric layer having a dielectric constant of at least $10^3$ disposed between said conductive regions of said signal electrode and said ground electrode;
    a ground conductor;
    a plurality of ground connectors electrically connecting said conductor regions of said ground electrode to said ground conductor; and
    a second dielectric layer have a dielectric constant of at least $10^0$;
        said ground conductor being separated from said conductive regions of said ground electrode by said second dielectric layer and thus from said first dielectric layer; and
        each of said signal conductor being lead through said second dielectric layer.

8. The coaxial capacitor according to claim 7, wherein said at least two mutually insulated conductive regions include an electronic component connecting directly adjacent mutually insulated conductive regions forming a series circuit; and said electric component is a resistance element.

9. The axial capacitor according to claim 8, wherein said resistance element has a characteristic impedance in the same order as said ground electrodes.

10. The axial capacitor according to claim 9, wherein said resistance element is a surface mounted component soldered to each said at least two conductor regions.

11. The axial capacitor according to claim 9, wherein said resistance element is formed of a resistance paste.

12. The axial capacitor according to claim 9, wherein said resistance element is a non-reactive resistance element.

* * * * *

UNITED STATES PATENT AND TRADEMARK OFFICE
CERTIFICATE OF CORRECTION

PATENT NO.    : 6,396,678 B1
DATED         : May 28, 2002
INVENTOR(S)   : Jan Meppelink et al.

It is certified that error appears in the above-identified patent and that said Letters Patent is hereby corrected as shown below:

<u>Title page,</u>
Item [73], should read as follows: -- Assignee: FILTEC Filtertechnologie für die Elektronikindustrie GmbH Lippstadt, (DE) --

Signed and Sealed this

Twenty-sixth Day of November, 2002

Attest:

Attesting Officer

JAMES E. ROGAN
Director of the United States Patent and Trademark Office